United States Patent
Delaforce

[19]

[11] Patent Number: 6,102,624
[45] Date of Patent: Aug. 15, 2000

[54] METHOD AND APPARATUS FOR INSTALLING A REPLACEMENT PIPE

[75] Inventor: Stephen Robert Delaforce, Loscoe, United Kingdom

[73] Assignee: BG PLC, Reading, United Kingdom

[21] Appl. No.: 08/854,757

[22] Filed: May 12, 1997

Related U.S. Application Data

[63] Continuation of application No. 08/761,453, Dec. 6, 1996, abandoned.

[30]   Foreign Application Priority Data

Dec. 5, 1996 [GB] United Kingdom ............... 9625365

[51] Int. Cl.⁷ .............. F16L 1/00; F16L 55/16
[52] U.S. Cl. .......... 405/184; 405/154; 405/156; 138/97; 138/98; 156/294
[58] Field of Search ................ 405/154, 156, 405/184; 138/97, 98, 89; 156/287, 293, 294, 297; 264/269, 36.16, 516

[56]         References Cited

U.S. PATENT DOCUMENTS

| | | | |
|---|---|---|---|
| 3,616,516 | 11/1971 | Corriston | 138/97 X |
| 4,456,401 | 6/1984 | Williams | 156/294 X |
| 4,956,032 | 9/1990 | Hahn et al. | 156/294 X |
| 5,060,696 | 10/1991 | Putter | 138/98 |
| 5,063,967 | 11/1991 | Stephens | 138/98 |
| 5,241,993 | 9/1993 | Stephens | 138/98 |
| 5,287,893 | 2/1994 | Elgar et al. | 138/98 |
| 5,345,971 | 9/1994 | Elgar et al. | 138/98 |
| 5,427,154 | 6/1995 | Stephens | 138/98 |
| 5,791,378 | 8/1998 | Stephens | 138/98 |
| 5,845,668 | 12/1998 | Taylor et al. | 138/97 X |

FOREIGN PATENT DOCUMENTS

| | | | |
|---|---|---|---|
| 2227071 | 7/1990 | United Kingdom | 405/156 |
| 2299645 | 10/1996 | United Kingdom | 405/156 |

*Primary Examiner*—Eileen Dunn Lillis
*Assistant Examiner*—Jong-Suk Lee
*Attorney, Agent, or Firm*—William H. Holt

[57]         ABSTRACT

A replacement pipe is installed within an existing service pipe (1) by first advancing a sealing means (6,8) along the existing pipe to a position adjacent its junction with a main pipe (2), then deploying the sealing means to seal against the inner surface of the existing pipe) in the example shown, by pumping sealant (10) into the space between the seal body (6) and the pipe (1), and subsequently advancing the replacement pipe along the existing pipe. The space between the two pipes is then filled with sealant and finally the sealing means is opened, in the example shown by withdrawing a guide rod (5) and its collar (7) on which the sealing means was advanced into position.

1 Claim, 21 Drawing Sheets

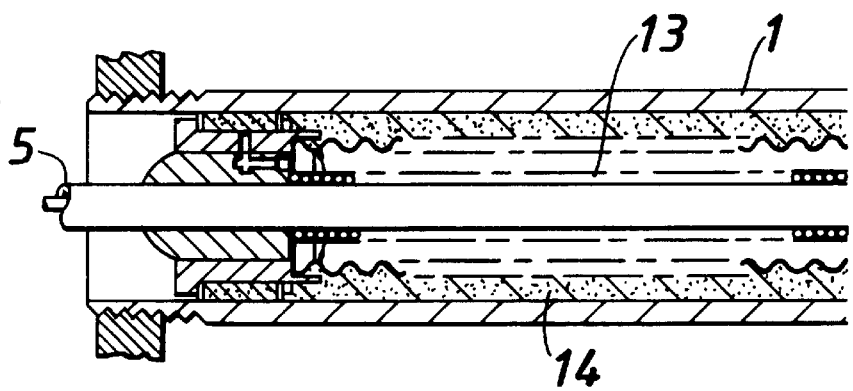
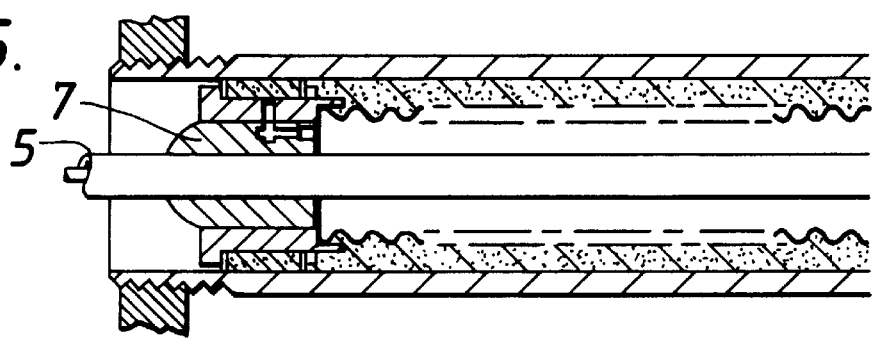
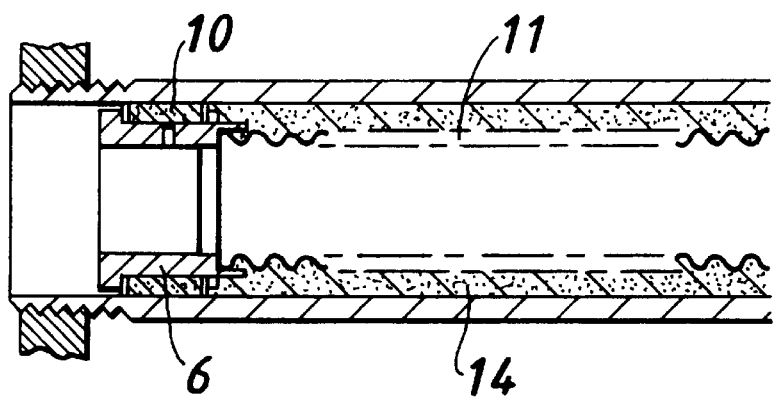

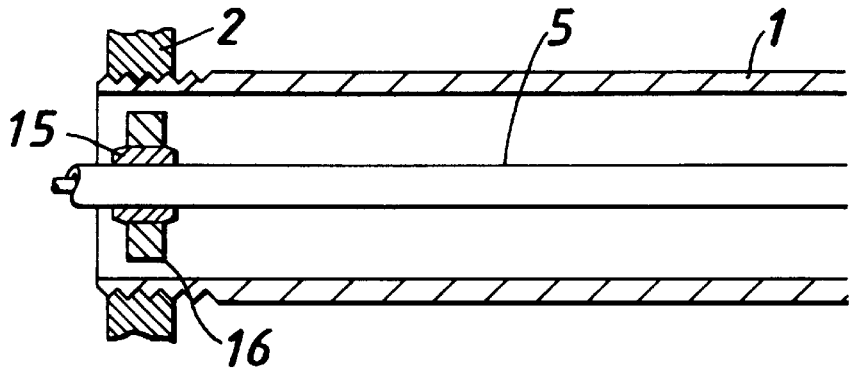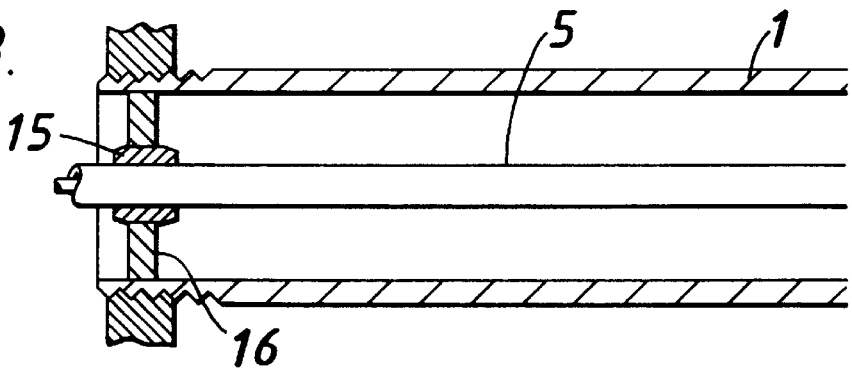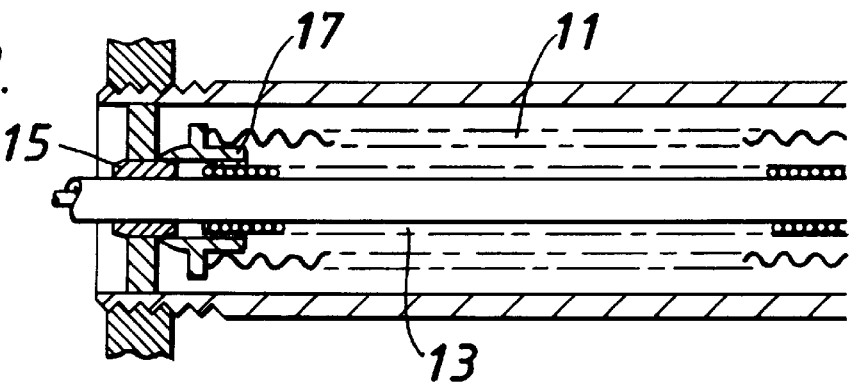

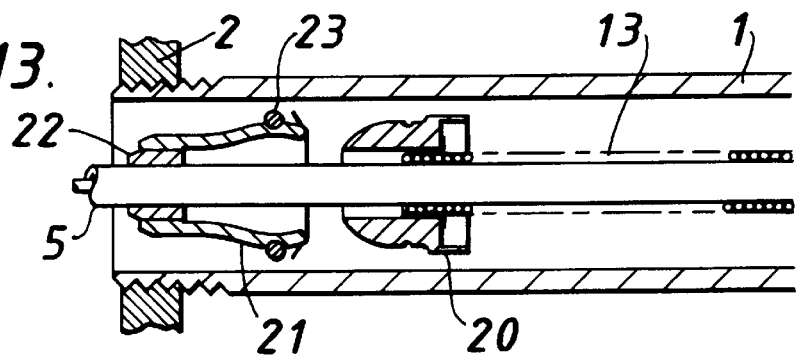
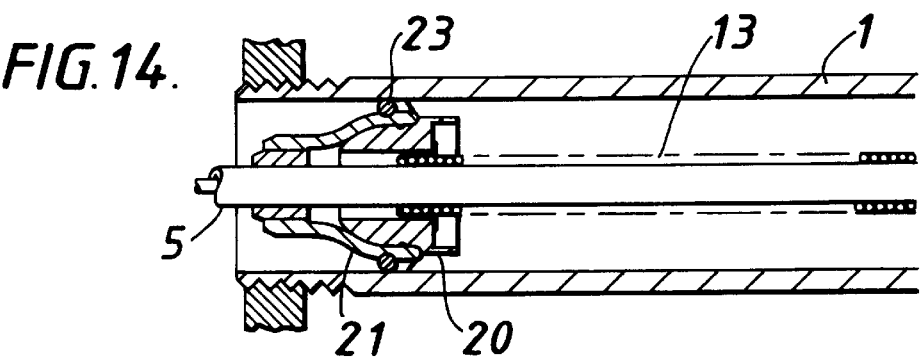
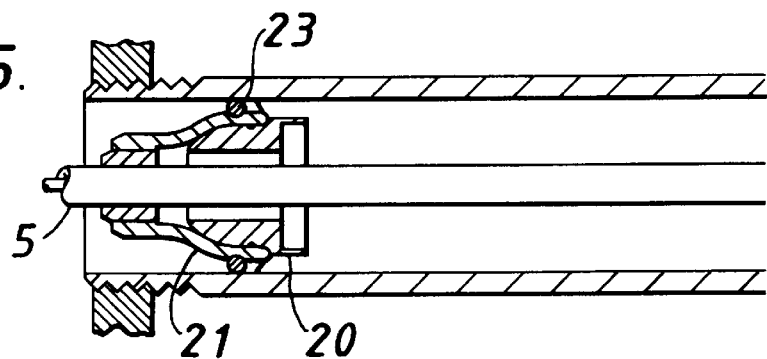

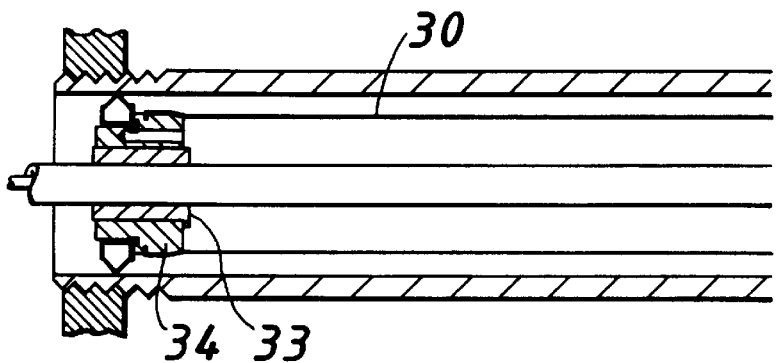
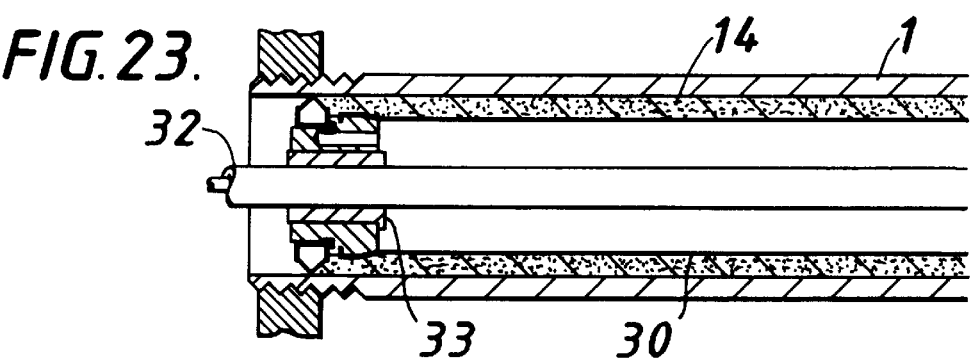
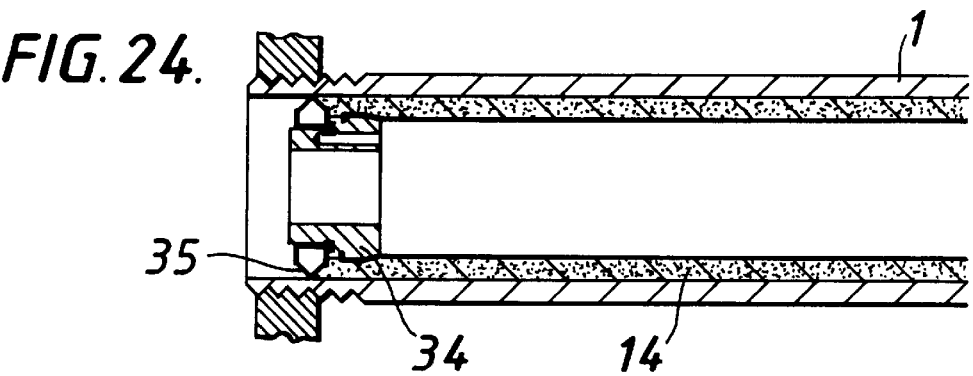

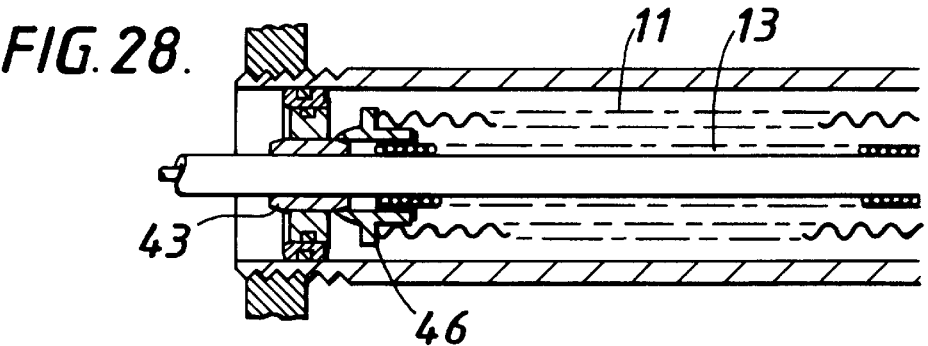
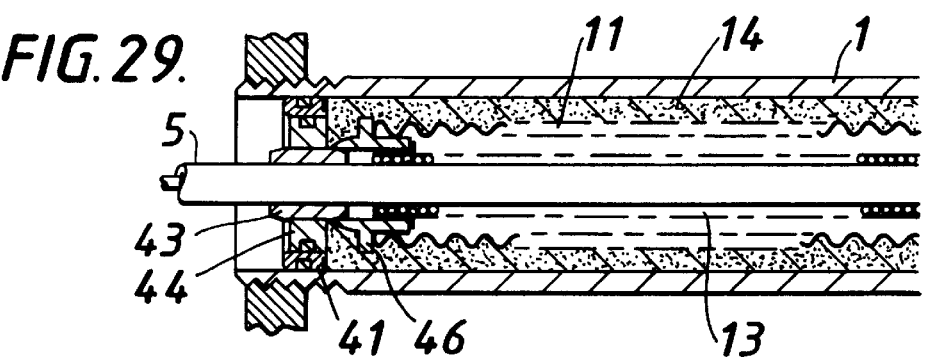
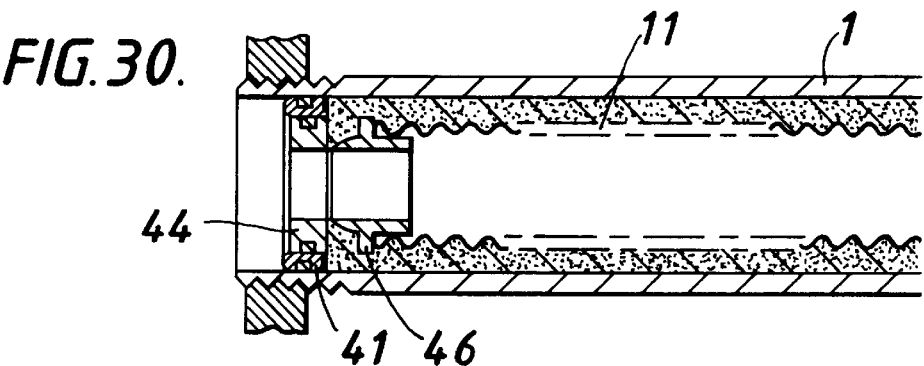

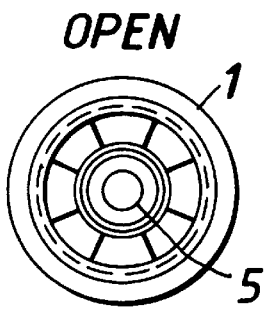
OPEN
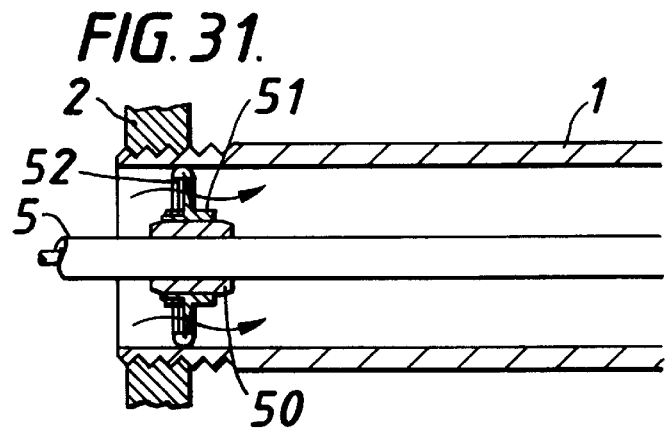
FIG. 31.
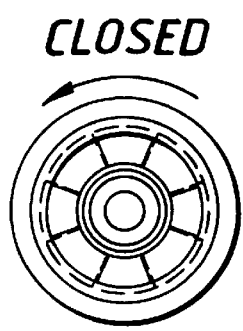
CLOSED
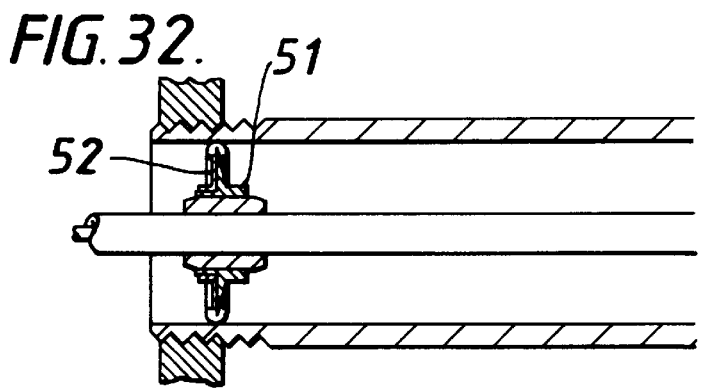
FIG. 32.
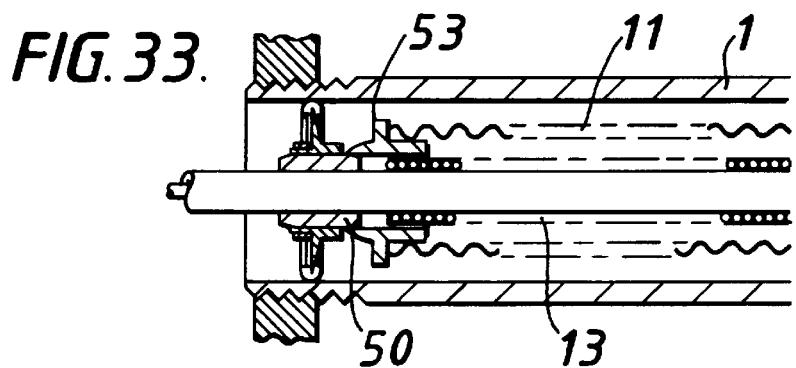
FIG. 33.

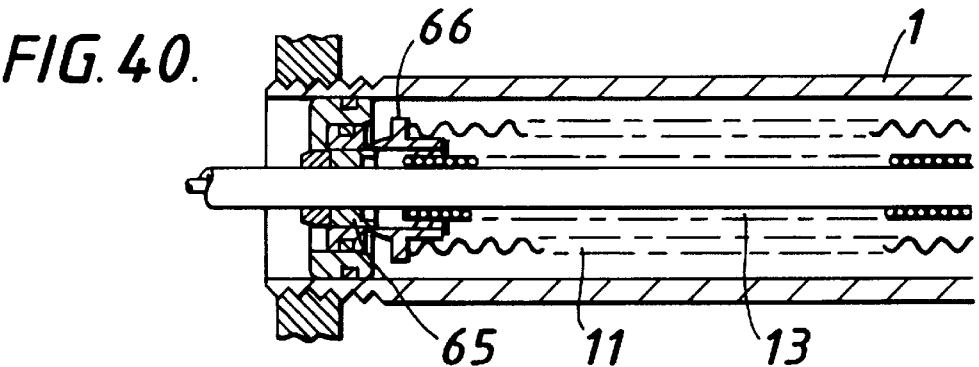
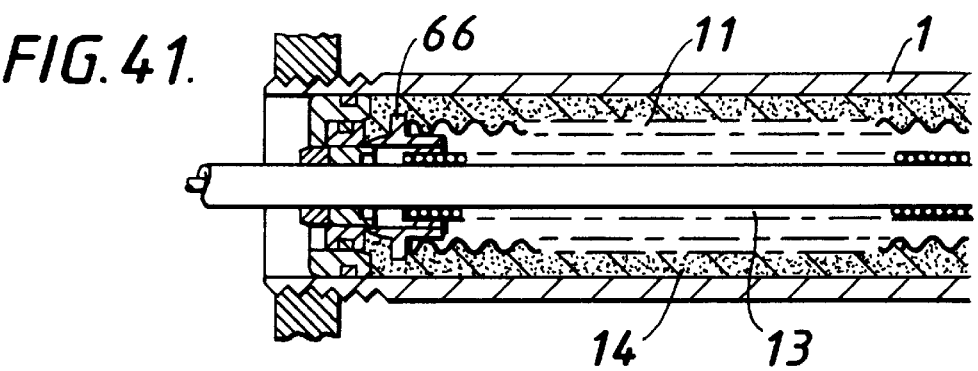
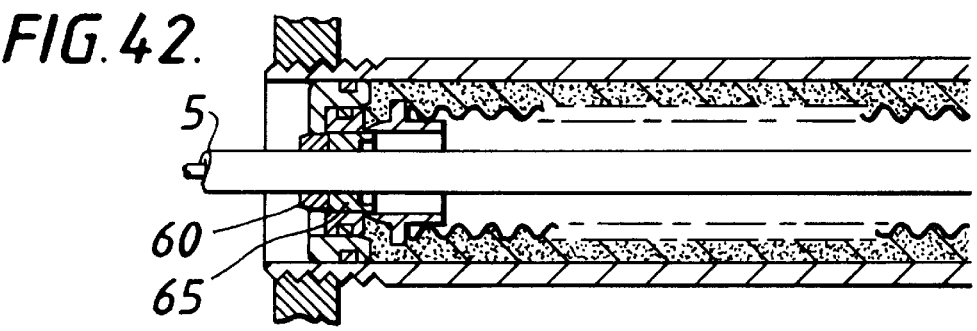

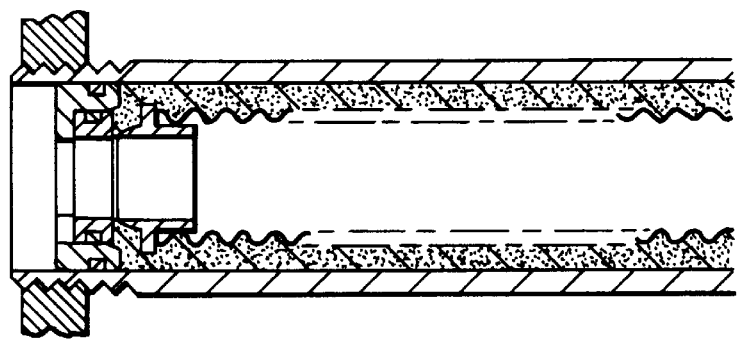
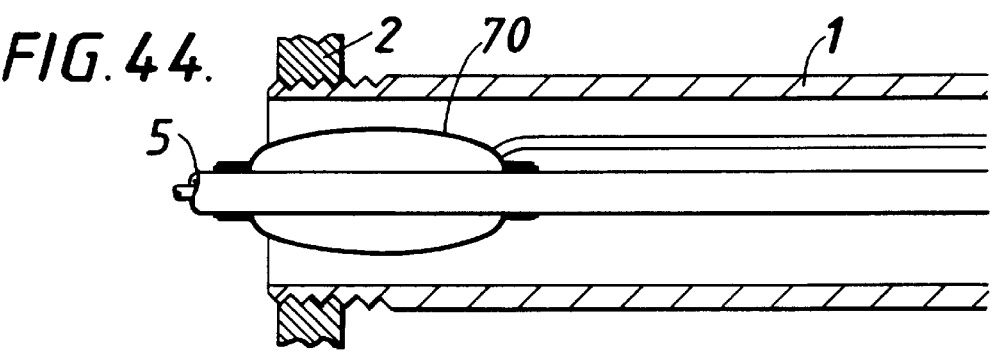
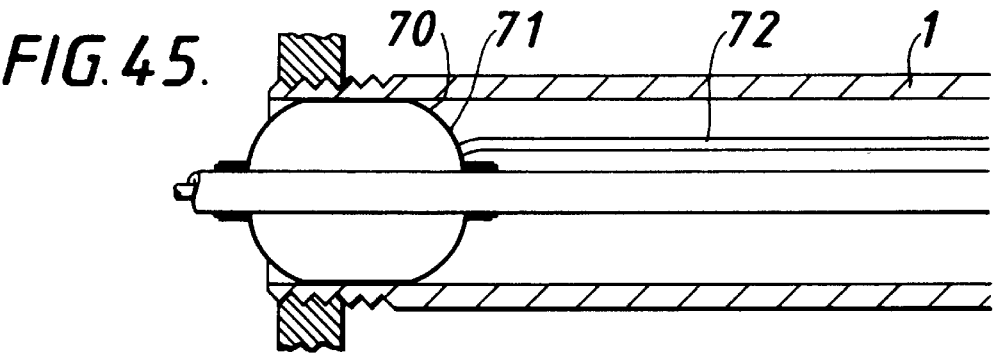

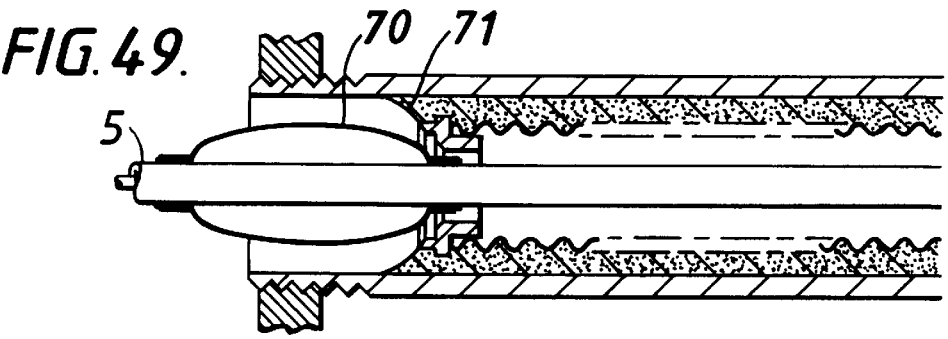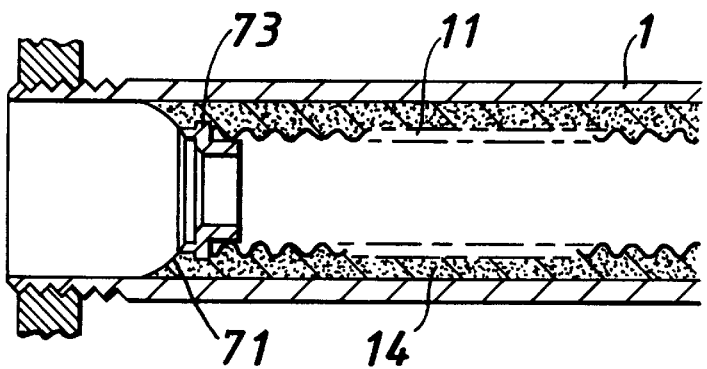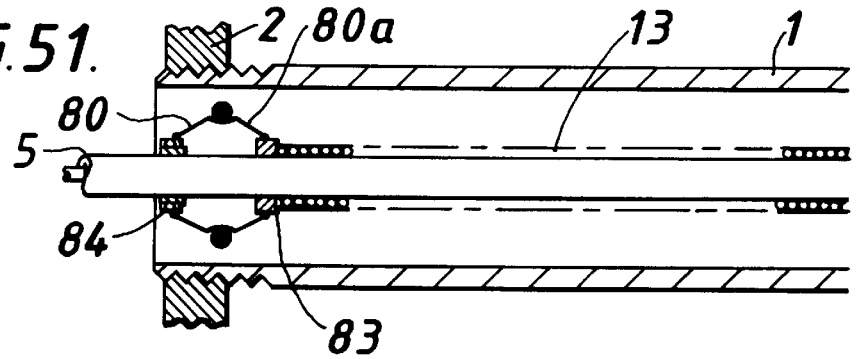

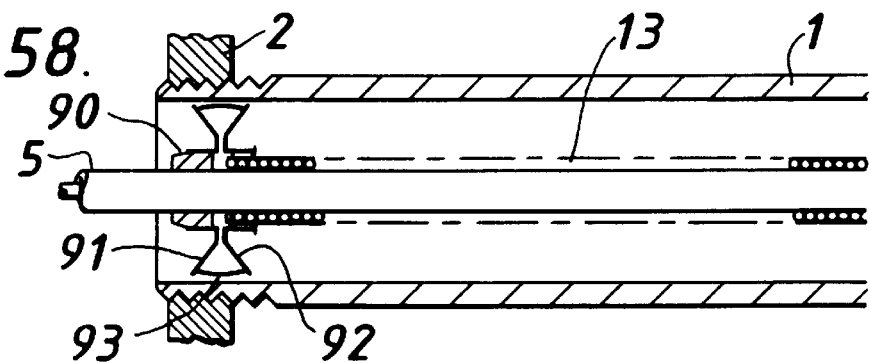
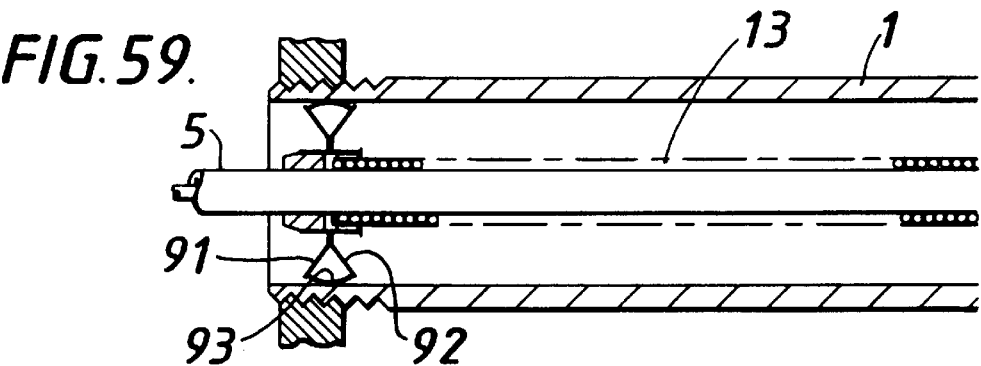
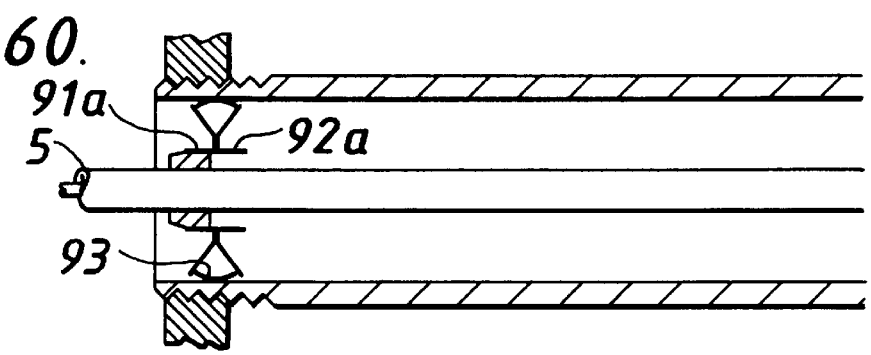

METHOD AND APPARATUS FOR INSTALLING A REPLACEMENT PIPE

CROSS REFERENCE TO RELATED APPLICATIONS

This is a continuation of U.S. application Ser. No. 08/761,453 filed on Dec. 6, 1996, now abandoned.

The present invention relates to a method and apparatus for installing a replacement pipe in an existing service pipe.

The invention is particularly, but not solely, applicable to the installation of a service pipe of plastics material in an existing gas service pipe of steel.

BACKGROUND OF THE INVENTION

GB-2227071 discloses a method for installing a plastics service pipe in an existing steel service pipe which extends from a main pipe to a meter within a consumer's premises. Firstly the meter is removed: then the plastics pipe is inserted through a gland fitted to the open end of the existing service pipe and advanced along the service pipe up to a point adjacent the junction of the service pipe with the main pipe. The plastics pipe has a sealing head fitted to its leading or forward end, which closes that end of the pipe and also seals against the interior of the existing service pipe. Once the plastics pipe has been advanced to the required position, fluid sealant is fed into the annular space between the exterior of the plastics pipe and the interior surface of the existing service pipe. The sealant is allowed to set, and then a flexible rod having a pointed end is advanced along the plastics pipe to break the seal across its forward end and open the replacement pipe for the flow of gas from the main pipe.

The above-described method is applicable to low pressure systems, in which therefore the force acting on the sealing head, as the plastics pipe is advanced into the existing service pipe, is relatively small: accordingly, the plastics pipe can be advanced manually without difficulty. However, for higher pressure systems, for example systems operating at pressures up to 7 bar, the resulting force acting on the sealing head at the forward end of the plastics pipe would be too high to permit the plastics pipe to be advanced manually along the existing service pipe.

GB-2299645 discloses methods for installing a replacement plastics pipe in an existing steel service pipe, which methods are suited to use on systems which operate at high pressures. In these methods, a seal is advanced along the existing service pipe using an elongate flexible assembly, but the seal is not deployed until it reaches the required position. Some embodiments require the seal to be advanced beyond the far end of the existing service pipe, where it joins the main pipe, and then deployed to engage against that end of the service pipe: however, it is not always possible or convenient to achieve this and the seal may not be wholly effective, for example if the end of the existing pipe is damaged. Other embodiments require that the elongate flexible assembly advances the plastics replacement pipe along the existing service pipe at the same time as it advances the seal into position, and therefore before the seal is deployed: however, this can lead to difficulties in advancing the replacement pipe against the full normal operating pressure.

SUMMARY OF THE INVENTION

In accordance with the present invention, as seen from one aspect, there is provided a method of installing a replacement pipe within an existing pipe, the method comprising the steps of advancing a sealing means along said existing pipe from one end thereof and then deploying said sealing means, once it has been advanced to a desired position, to seal against the interior surface of the existing pipe, subsequently advancing said replacement pipe along said existing pipe from said one end of the latter, introducing sealant material into the space between said replacement pipe and said existing pipe, and opening said sealing means.

In this method, the sealing means engages the interior surface of the existing pipe, rather than against the end of the existing pipe, so that an effective seal can be ensured at a convenient position within the existing pipe (typically adjacent its junction with a main pipe) Furthermore, because the replacement pipe is not advanced along the existing pipe until after the seal is deployed, it will not meet with any resistance due to be prevailing gas pressure.

Preferably an elongate flexible guide element is used to advance said sealing means to its said desired position, and said step of opening said sealing means comprises withdrawing said guide element.

Preferably a frangible seal between a body part of said sealing means and said guide element, or a collar on said guide element, is broken upon withdrawal of said guide element, to open said sealing means.

Preferably the replacement pipe is advanced along said existing pipe using an elongate flexible guide element extending within said replacement pipe and coupled to its forward end. Preferably the guide element used to advance the replacement pipe is a tubular element which surrounds, and slides along, the flexible guide element used to advance the sealing means.

Also in accordance with the present invention, as seen from a second aspect, there is provided a method of installing a replacement pipe within an existing pipe, the method comprising the steps of advancing a sealing means along said existing pipe from one end thereof, the forward end of said replacement pipe being coupled to said sealing means but said replacement pipe being in a reduced cross-sectional configuration along substantially the whole of its length, deploying said sealing means once it has been advanced to a desired position, forming said replacement pipe to an expanded cross-sectional configuration, introducing sealant material into the space between said replacement pipe and said existing pipe, and opening said sealing means.

In use of this method, although the replacement pipe is advanced along the existing pipe together with the sealing means, and therefore before the sealing means is deployed, the displacement of the replacement pipe is not greatly resisted because it is in its reduced cross-sectional configuration.

For example, the replacement pipe may comprise a shape-memory plastics pipe, which is recovered when required by the application of heat. As another example, the replacement pipe may be in a flattened or a U-shape configuration, and is expanded by the introduction of fluid under pressure to its interior.

The sealing means which is used in the methods of the present invention may take a number of different forms.

Thus, in accordance with the present invention as seen from a third aspect, there is provided apparatus for sealing an existing pipe in the process of installing a replacement pipe within it, said apparatus comprising a seal body and means for introducing sealant material into an annular space between the periphery of said seal body and the interior surface of said existing pipe.

In accordance with the present invention as seen from a fourth aspect, there is provided an apparatus for sealing an existing pipe in the process of installing a replacement pipe within it, said apparatus comprising a shape-memory seal body arranged, upon recovery, to expand radially into sealing engagement with the interior surface of said existing pipe.

In accordance with the present invention as seen from a fifth aspect, there is provided an apparatus for sealing an existing pipe in the process of installing a replacement pipe within it, said apparatus comprising a seal body arranged for fitment thereto of the forward end of the replacement pipe, and having a seal for radial expansion into sealing engagement with the interior surface of the existing pipe.

In accordance with the present invention as seen from a sixth aspect, there is provided an apparatus for sealing an existing pipe in the process of installing a replacement pipe within it, said apparatus comprising radially inner and outer seal bodies, the outer seal body being arranged to seal against the interior surface of the existing pipe and the inner seal body being arranged to engage within the outer seal body upon axial displacement of the two seal bodies relative to each other.

In accordance with the present invention as seen from a seventh aspect, there is provided an apparatus for sealing an existing pipe in the process of installing a replacement pipe within it, said apparatus comprising a seal body for sealing against the interior surface of the existing pipe and having apertures therethrough, and an element which is rotatable relative to said seal body to close said apertures.

In accordance with the present invention as seen from an eighth aspect, there is provided an apparatus for sealing an existing pipe in the process of installing a replacement pipe within it, said apparatus comprising first and second seal bodies to which respective annular elements are mounted, said first and second seal bodies being axially displaceable relative to each other to deflect said annular elements radially outwards to engage the interior surface of said existing pipe.

In accordance with the present invention as seen from a ninth aspect, there is provided an apparatus for sealing an existing pipe in the process of installing a replacement pipe within it, said apparatus comprising two annular seal bodies supporting an annular seal between them, said seal being deformed radially outwards upon relative axial displacement of said two seal bodies.

BRIEF DESCRIPTION OF THE DRAWINGS

Embodiments of the present invention will now be described by way of examples only and with reference to the accompanying drawings, in which:

FIGS. 1 to 6 are schematic longitudinal sectional views of an end portion of an existing service pipe, showing successive stages in the installation of a replacement pipe in accordance with a first embodiment of the invention;

FIGS. 7 to 11 are similar views of the service pipe, showing successive stages in the installation of the replacement pipe in accordance with a second embodiment of the invention;

FIGS. 13 to 19 are schematic longitudinal sectional views of the end portion of the existing service pipe, showing successive stages in the installation of the replacement pipe in accordance with a third embodiment of the invention;

FIGS. 20 to 24 are similar views of the service pipe, showing successive stages in the installation of the replacement pipe in accordance with a fourth embodiment of the invention;

FIGS. 25 to 30 are similar views of the service pipe, showing successive stages in the installation of the replacement pipe in accordance with a fifth embodiment of the invention;

FIGS. 31 to 36 are similar views of the service pipe, showing successive stages in the installation of the replacement pipe in accordance with a sixth embodiment of the invention;

FIGS. 37 to 43 are similar views of the service pipe, showing successive stages in the installation of the replacement pipe in accordance with a seventh embodiment of the invention;

FIGS. 44 to 50 are similar views of the service pipe, showing successive stages in the installation of the replacement pipe in accordance with an eighth embodiment of the invention;

FIGS. 51 to 57 are similar views of the service pipe, showing successive stages in the installation of the replacement pipe in accordance with a ninth embodiment of the invention; and FIGS. 58 to 64 are similar views of the service pipe, showing successive stages in the installation of the replacement pipe in accordance with a tenth embodiment of the invention.

Referring to FIG. 1 of the drawings, there is shown an end portion of a steel service pipe 1 where it enters a main pipe 2 through an aperture in the wall of the latter. The main pipe carries gas at pressures up to 7 bar, and in normal use gas flows from the main pipe 2 and along the service pipe 1 to a consumer's installation. In order to install a replacement pipe into the steel service pipe 1, the consumer's end of the service pipe 1 is made accessible and fitted with a sealing arrangement (for example as disclosed in GB-2227071): this sealing arrangement maintains the consumer's end of the service pipe closed against the flow of gas, but enables selected components (as will be described below) to be inserted into that end of the service pipe for advancement along it.

As shown in FIG. 1, an elongate flexible guide rod 5 is inserted into the service pipe 1 at the consumer's end and advanced along the service pipe 1 until it reaches the junction with the main pipe 2. The guide rod 5 carries, adjacent its forward end, a collar 7 which in turn carries an annular seal body 6. Two ring seals 8 are mounted at axially-spaced positions on the exterior of the seal body 6, to co-operate with the interior surface of the service pipe 1: however, the ring seals 8 form only a light sealing function and do not prevent high pressure gas from flowing over them and accordingly the assembly of guide rod 5, its collar 7 and seal body 6 do not experience any high resistance against being advanced manually along the service pipe 1 to the position shown.

Figure 1:
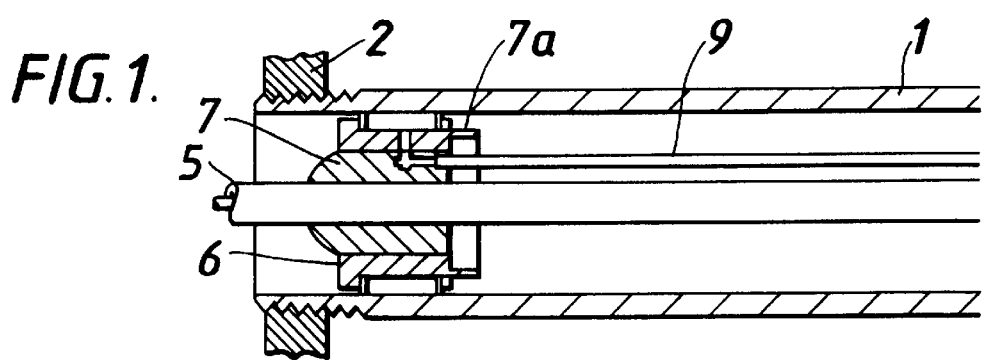
Figure 2:
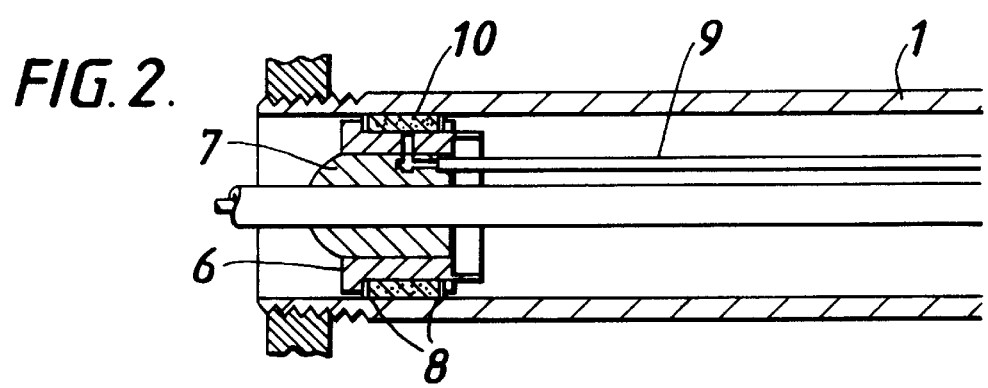

In the next stage, as shown in FIG. 2, sealant is pumped along a tube 9, connected to the trailing or rear end of the collar 7, and through a passage in the collar 7, into the annular space 10 between the seal body 6 and the interior surface of the service pipe 1: the sealant is confined, in the axial direction, by the ring seals 8. The tube 9 is then disconnected from the collar 7 (e.g. by unscrewing) and withdrawn and the sealant is allowed to cure. Once set, the sealant holds the collar 7 and seal body 6 in position against the pressure of gas in the main pipe 2.

Figure 3:
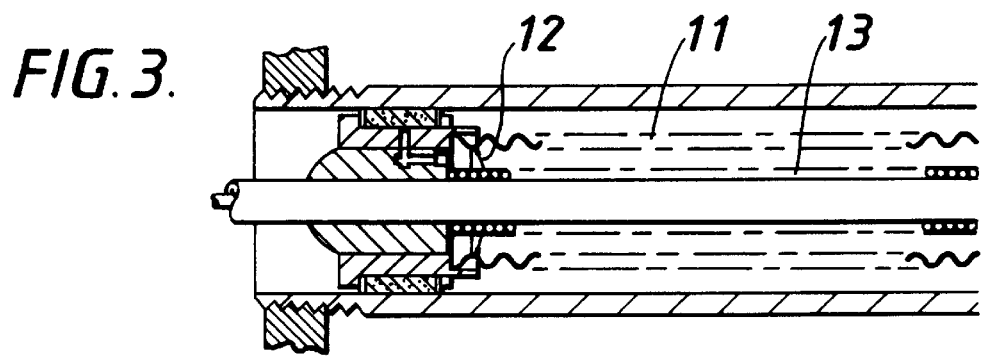

At this stage, the consumer's end of the service pipe 1 is opened and the replacement pipe 11 is inserted and advanced along it (FIG. 3). The replacement pipe 11 is a plastics pipe which is circumferentially corrugated to provide flexibility. A tubular guide 13, in the form of a helical coil of wire, lies within the replacement pipe 11 and carries a thrust ring 12 adjacent its forward end, which engages the interior of the replacement pipe 11 adjacent its forward end. The tubular guide 13 is engaged over the guide rod 5, and is manually advanced, pushing the replacement pipe 11 with it, until the forward end of the replacement pipe 11 locates within a socket defined by an annular rim 7a on the rear end of the collar 7. Then, as shown in FIG. 4, sealant 14 is introduced to fill the space between the exterior of the replacement pipe 11 and the interior surface of the service pipe 1.

Once the sealant 14 has cured, the tubular guide 13 is withdrawn (FIG. 5), and then the guide rod 5 and collar 7 are withdrawn, leaving the seal body 6 in position (FIG. 6) and allowing mains gas to flow into the replacement pipe. The collar 7 may be connected to the seal body 6 by a frangible seal, which is broken by pulling on the guide rod 5. It will be appreciated that before the guide rod 5 and collar 7 are withdrawn, the sealing arrangement must be refitted to the consumer's end of the service pipe.

FIGS. 7 to 11 show the successive stages of a similar method of installing the replacement pipe 11 in the service pipe 1. As shown in FIG. 7, the flexible guide rod 5 carries a collar 15 to which an annular shape-memory seal 16 is mounted. Once the guide rod 5 has been advanced to position the seal 16 adjacent the end of the service pipe 1, the seal 16 is caused to recover its shape (FIG. 8), in which recovered shape it seals against the interior surface of the service pipe 1. The recovery in shape of the seal 16 is caused by the application of heat e.g. by an electrical heat source (not shown).

Figure 10:
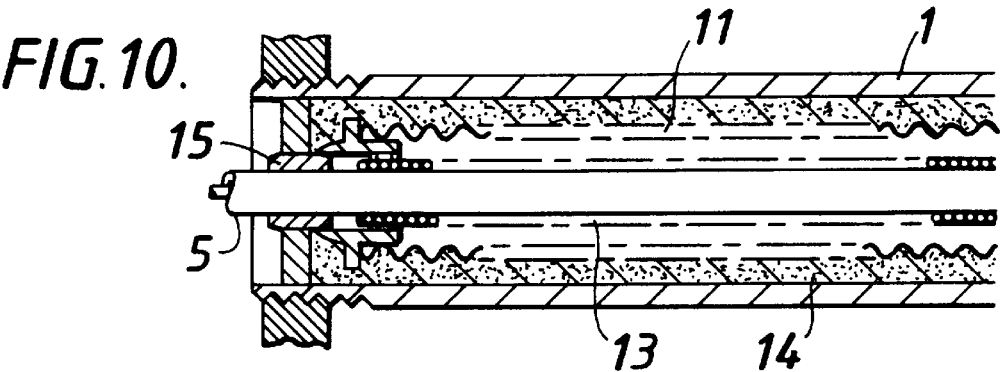
Figure 11:
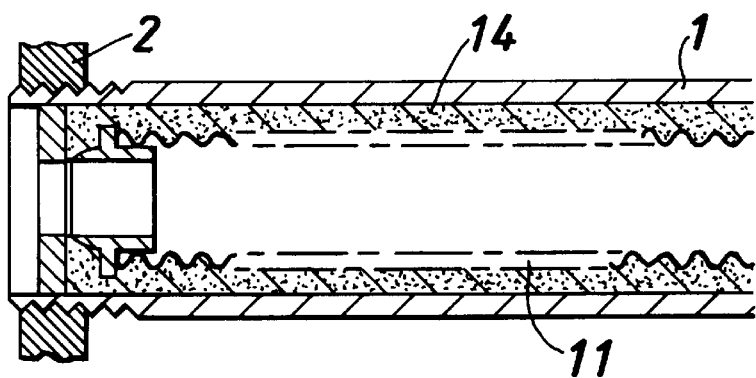

Next, as shown in FIG. 9, the replacement pipe 11 is advanced along the service pipe 1, using the tubular guide 13 which is slid along the guide rod 5. In this case, an annular nose cone 17 is carried on the end of the tubular guide 13 and the end of the replacement pipe 11 seats on the rear end of the nose cone. The tubular guide 13 is advanced until the forward end of the nose cone 17 locates around the collar 15. Then the sealant 14 is introduced into the space around the replacement pipe 11 and allowed to cure (FIG. 10). Finally, the guide rod 5 is withdrawn, breaking a frangible seal between the collar 15 and the seal 16 and so withdrawing the collar 15 and also the tubular guide 13 (FIG. 11).

Figure 12:
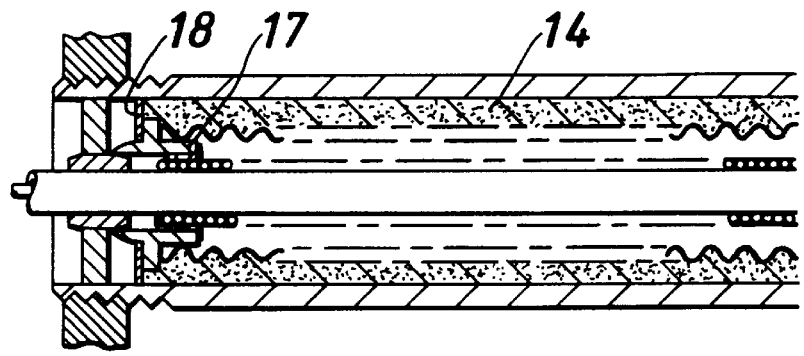
FIG. 12 is a similar view to FIG. 10, showing the use of a modified nose cone at the leading end of the replacement pipe.

In the modification shown in FIG. 12, the nose cone 17 is provided with an annular seal 18 spaced rearwardly of its forward end, and arranged to seal against the interior surface of the service pipe 1 and limit the forward flow of the sealant 14.

FIGS. 13 to 19 show the successive stages of the third embodiment for installing the replacement pipe 11. In this case (FIG. 13), a tubular seal body 21 has a forward end mounted to a collar 23 fitted onto the guide rod 5: an annular seal 23 is carried on the outside of the seal body 21, adjacent its rear end. Once the guide rod 5 has been advanced to the desired position, the tubular guide 13 is advanced: a nose cone 20 is fitted to the forward end of the tubular guide 13 and is arranged to enter the rear end of the seal body 21 and so radially expand the latter to cause the annular seal 23 to engage and seal against the interior surface of the service pipe 1 (FIG. 14): the nose cone 20 and seal body 21 are arranged to interlock so as to remain together. Then the tubular guide 13 is withdrawn (FIG. 15).

Figure 16:
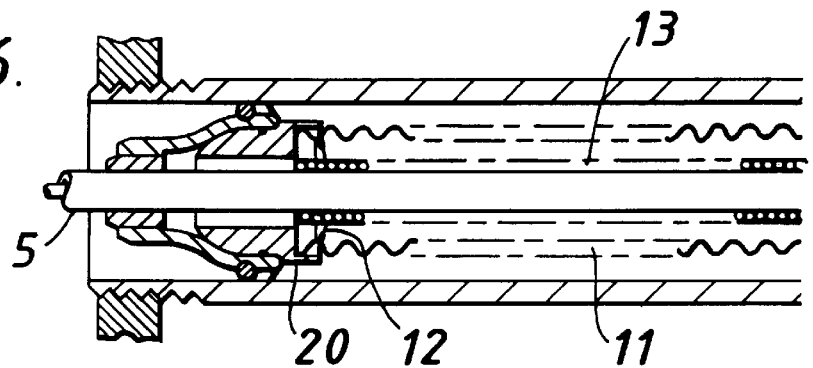

Next, the thrust ring 12 is fitted to the tubular guide 13 and the assembly is positioned within the replacement pipe 11. Then, as described with reference to FIG. 3, the replacement pipe 11 is advanced into the service pipe 1, the tubular guide 13 sliding along the guide rod 5, until the forward end of the replacement pipe 11 locates within a socket formed on the rear end of the nose cone 20 (FIG. 16).

Figure 17:
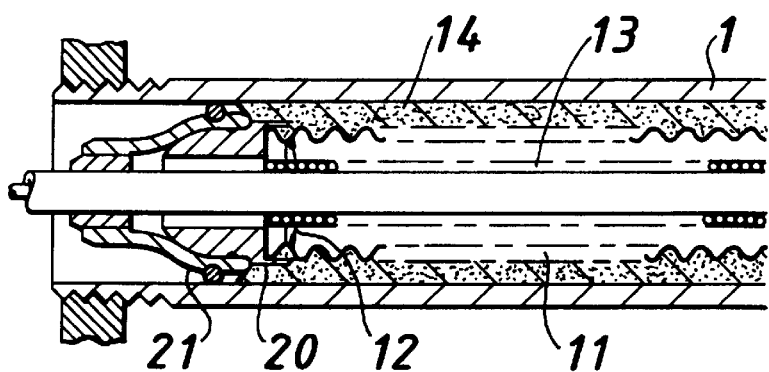
Figure 18:
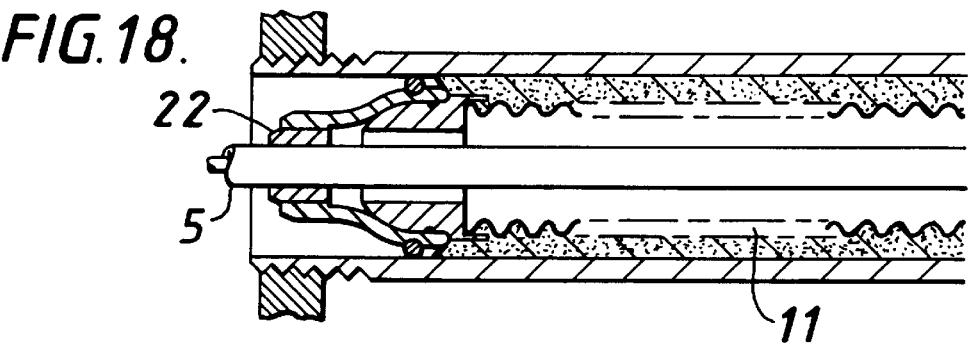
Figure 19:
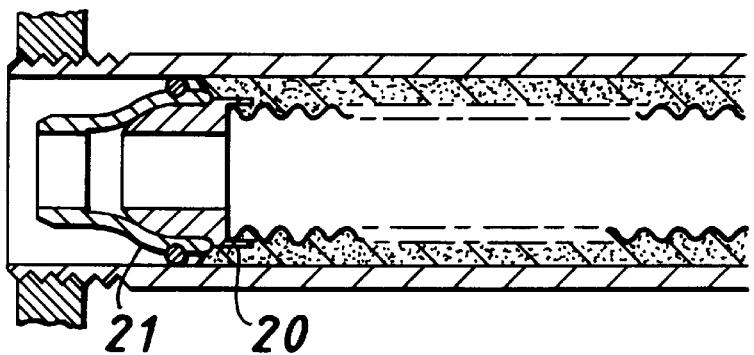

In the next stage, the sealant 14 is introduced to fill the space around the replacement pipe 11 (FIG. 17). Then the tubular guide 13 and thrust ring 12 are withdrawn (FIG. 18) and finally the guide rod 5 and its collar 22 are withdrawn (FIG. 19) to open the replacement pipe to the mains.

Figure 20:
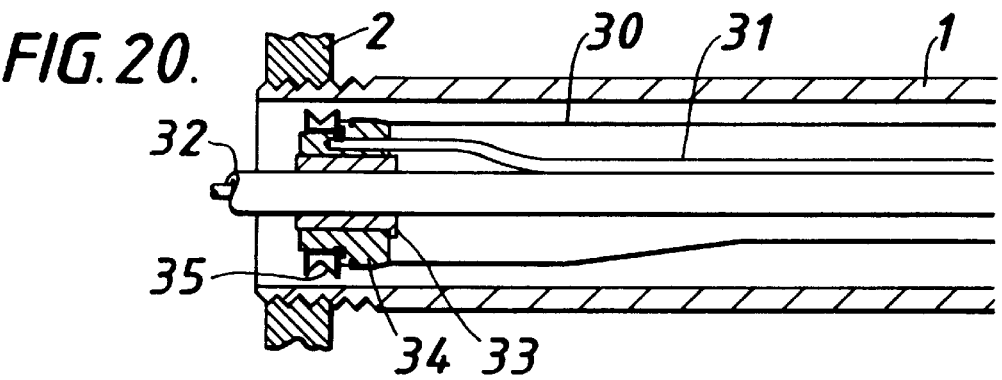

The fourth embodiment of the invention will now be described with reference to FIGS. 20 to 24 of the drawings. As shown in FIG. 20, the guide rod 5 carries a collar 33 which in turn carries an annular seal body 34, to which an inflatable annular seal 35 is mounted. A replacement pipe 30 is carried over the guide rod 32 and has its forward end secured around the seal body 34. The replacement pipe 30 is flexible and is of a reduced cross-sectional configuration, except for its forward end portion. For example, the pipe 30 may be a shape-memory plastics pipe in a flattened configuration; in another example, it may be a pipe deformed into a flattened or U-section. A feed tube 31 is also disposed within the pipe 30 and is connected to the seal body 34. The assembly of guide rod 5, replacement pipe 30 and feed tube 31 are advanced together into the service pipe 1 to reach the position shown in FIG. 20.

Figure 21:
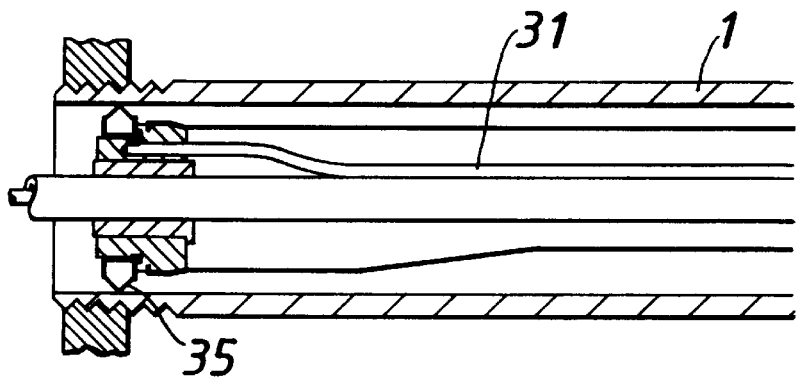
Figure 25:
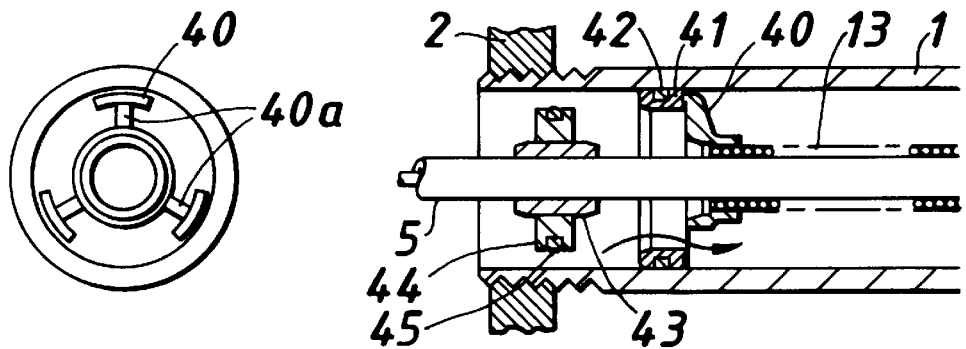

Then an appropriate fluid (e.g. nitrogen or other inert gas) is passed through the feed tube 31 and a one-way valve (not shown) provided in the seal body 34, to inflate the seal 35 into engagement with the interior surface of the service pipe 1, as shown in FIG. 21. Next the feed tube 31 is disconnected from the seal body 34, and is then used to pressurise the interior of the replacement pipe 30 to reform the latter to its required, expanded configuration as shown in FIG. 22: if the replacement pipe is a shape-memory pipe, the application of heat may be necessary to recover it.

In the next stage, the sealant 14 is introduced to fill the space around the replacement pipe 30 (FIG. 23). Finally, the guide rod 32 and its collar 33 are withdrawn (FIG. 24) to open the replacement pipe 30 to the mains 2.

Figure 26:
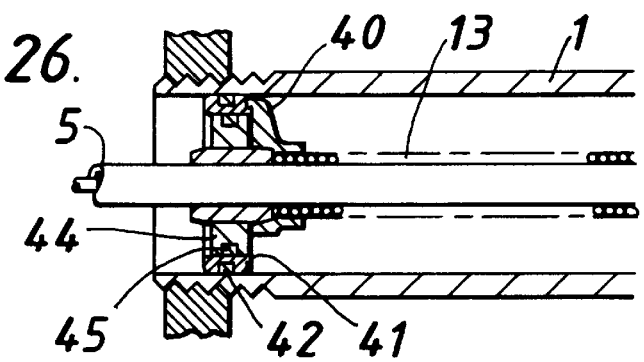
Figure 27:
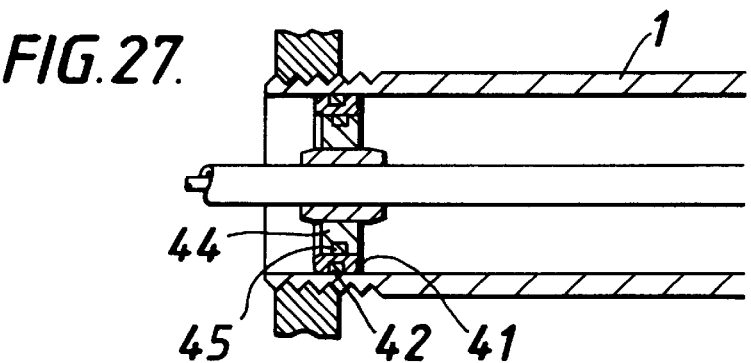

The fifth embodiment will now be described with reference to FIGS. 25 to 30 of the drawings. Firstly, the guide rod 5 and the tubular guide 13 are advanced together along the service pipe 1. The guide rod 5 carries a collar 43 which carries an annular seal body 44 fitted with an annular seal 45 around its periphery. Tubular guide 13 carries a collar 40 having three radial arms 40a to which an annular outer seal body 41 is coupled, the latter body having an annular seal 42 around its periphery. Whilst being advanced into the service pipe 1, the outer seal body 41 is spaced rearwardly of the inner seal body 44 so that gas is able to flow past the assembly. Then, as shown in FIG. 26, the tubular guide 13 is slid forwardly on the guide rod 5 (or the guide rod 5 is retracted relative to the tubular guide 13) to engage the outer seal body 41 around the inner seal body 44. A seal is thus formed across the service pipe 1, the seal 45 sealing between the inner and outer seal bodies and the seal 42 sealing between the outer seal body 41 and the service pipe 1. Next the tubular guide 13 is withdrawn, bringing with it the collar 40 (FIG. 27).

In the next stage (FIG. 28), the replacement pipe 11 is advanced into the service pipe 1, using the tubular guide 13 and a nose cone 46, as described above with reference to FIG. 9, until the forward end of the nose cone 46 engages around the collar 43. Then the sealant 14 is introduced to fill the space around the replacement pipe 11 (FIG. 29) and finally the guide rod 5, its collar 43 and the tubular guide 13 are removed (FIG. 30).

The sixth embodiment will now be described with reference to FIGS. 31 to 36 of the drawings. In this case, the guide rod 5 carries a collar 50 around which a seal arrangement 51,52 is mounted. This seal arrangement comprises a first disc 51 which seals against the interior surface of the service pipe 1 but is formed with a number of sector-shaped apertures, and a second disc 52 mounted face-to-face with the first disc 51 and formed with corresponding sector-shaped apertures. During advancement of the guide rod 5, the second disc 52 is turned so that its apertures are aligned with those of the first disc 51, so that the seal arrangement is open for the flow of gas. Then, the second disc 52 is turned relative to the first disc 51 using an actuating mechanism (not shown), to close the seal arrangement (FIG. 32).

Figure 34:
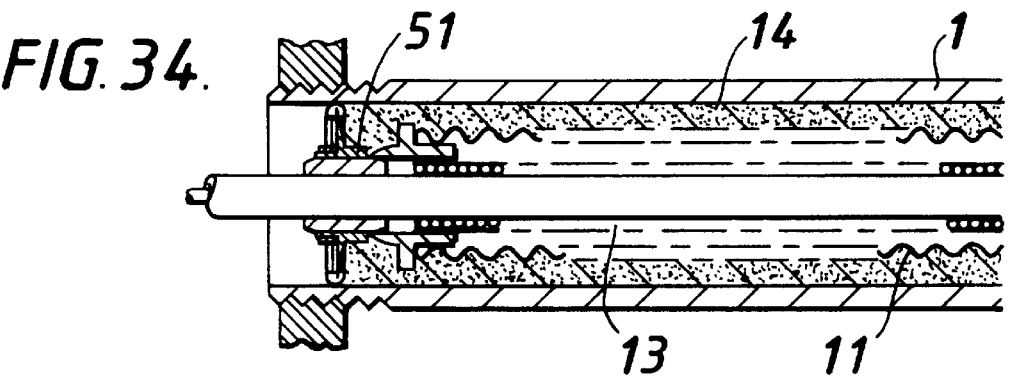
Figure 35:
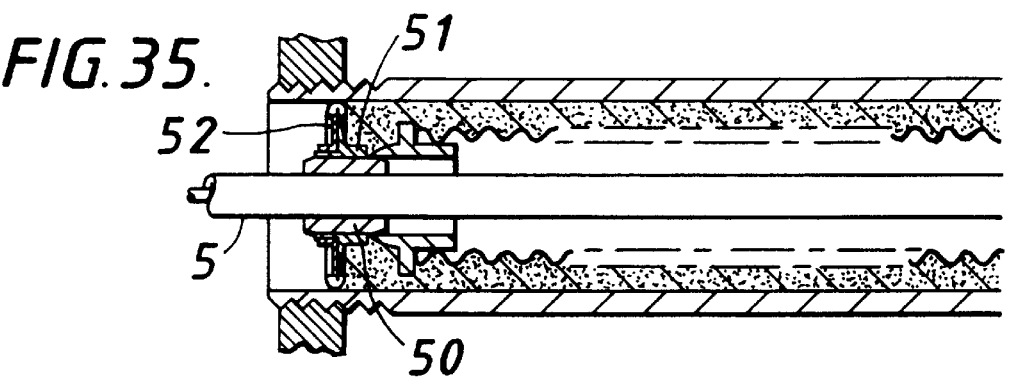
Figure 36:
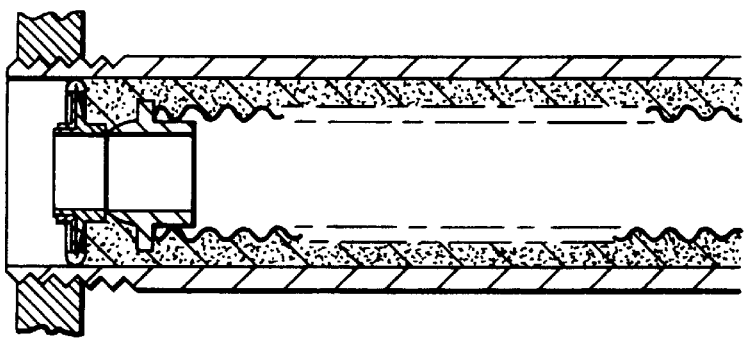

Next, referring to FIG. 33, the replacement pipe 11 is advanced along the service pipe 1, using the tubular guide 13 and a nose cone 50, in the manner described with reference to FIG. 9. The sealant 14 i s then introduced into the space around the replacement pipe 11 (FIG. 34). Finally, the tubular guide 13 is withdrawn (FIG. 35), following by the guide rod 5 and its collar 50 (FIG. 36).

Figure 37:
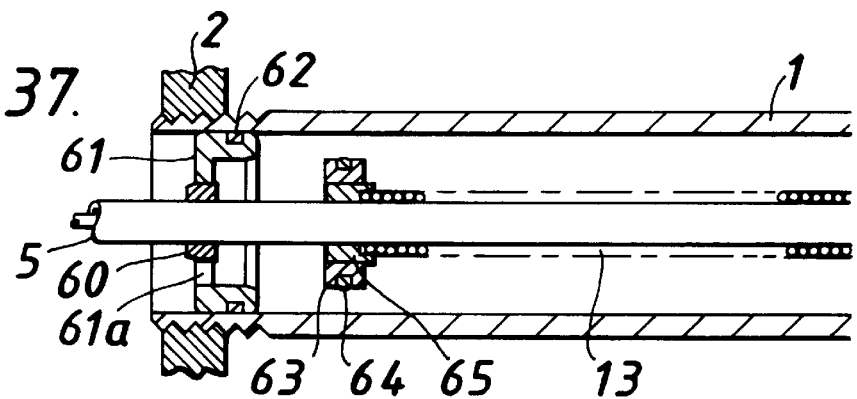

The seventh embodiment of the invention will now be described with reference to FIGS. 37 to 43 of the drawings. The guide rod 5 and tubular guide 13 are advanced together along the service pipe 1 (FIG. 37). The guide rod 5 carries a collar 60 which carries an outer seal body 61 having a peripheral seal 62 which seals against the interior surface of the service pipe 1: the outer seal body 61 is annular in shape and includes radial arms 61a by which it is mounted to the collar 60. The tubular guide 13 carries a collar 65 which carries an inner seal body 63 provided with a peripheral seal 64. Whilst the guide rod 5 and tubular guide 13 are advanced, the inner seal body 65 remains at a spacing to the rear of outer seal body 61, so that the gas is able to flow past.

Figure 38:
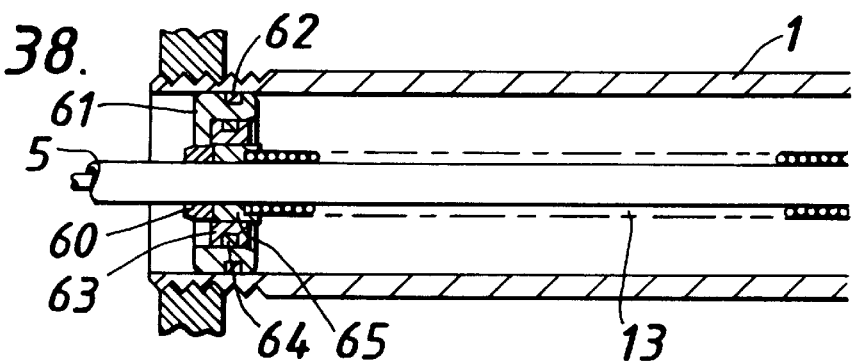

When the outer seal body 61 has reached the required position, the tubular guide 13 is slid forwardly on the guide rod 5 (or the guide rod is retracted relative to the tubular guide 13) to insert the inner seal body 63 into the centre of the annular outer seal body 61 (FIG. 38). A seal is thus formed across the service pipe 1, the seal 64 sealing between the two seal bodies and the seal 62 sealing the outer seal body against the interior of the service pipe 1.

Figure 39:
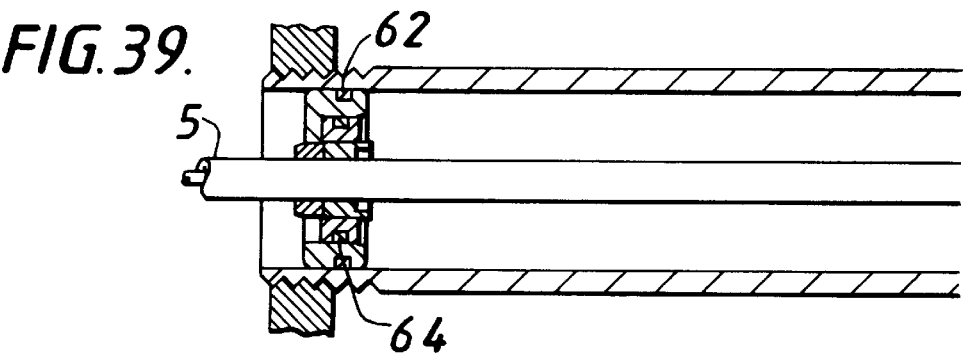
Figure 46:
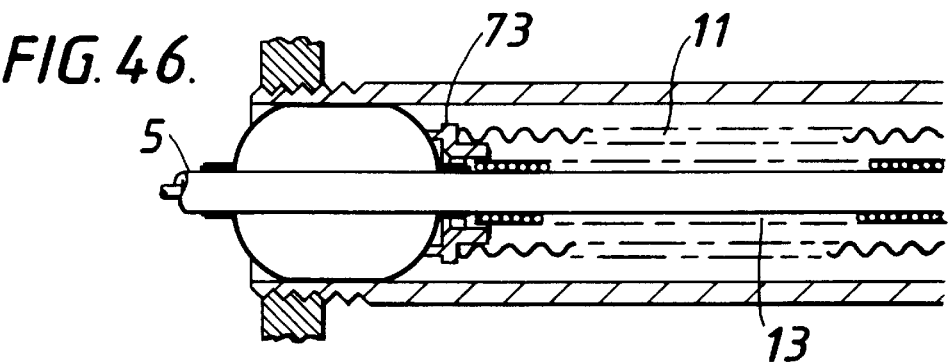

Next the tubular guide 13 is withdrawn (FIG. 39). The replacement pipe 11 is then advanced using the tubular guide 13 and a nose cone 66 (FIG. 40), in the manner previously described with reference to FIG. 9, until the front end of the nose cone 66 locates around a rearwardly-projecting end portion of the inner seal body 65. Then the sealant 14 is introduced to fill the space around the replacement pipe 11 (FIG. 41). Finally, the tubular guide 13 is withdrawn (FIG. 42), followed by the guide rod 5 and collars 60 and 65, to which the respective seal bodies 61, 63 are frangibly connected (FIG. 43).

Figure 47:
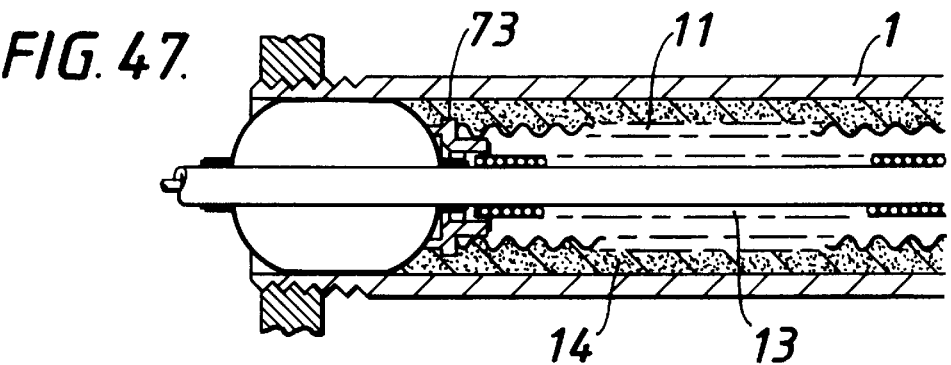
Figure 48:
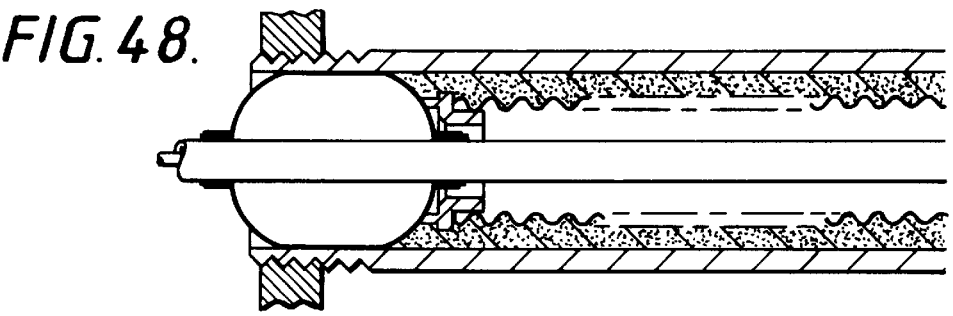

The eighth embodiment of the invention will now be described with reference to FIG. 44 to 50 of the drawings. In this case, as shown in FIG. 44, the guide rod 5 carries an inflatable body 70 to which a feed pipe 72 is connected. Once the guide rod 5 has been advanced as required, the body 70 is inflated by feeding fluid (e.g. nitrogen or other inert gas) under pressure through the pipe 72 and through a one-way valve of the body 70, to cause the inflated body 70 to seal against the interior surface of the service 71 pipe 1 (FIG. 45). Then the feed pipe 72 is disconnected and withdrawn. In the next stage (FIG. 46), the tubular guide 13 is used to advance the replacement pipe 11, the forward end of the tubular guide 13 carrying a collar 73 around which the forward end of the replacement pipe 11 is fitted. Next the sealant 14 is introduced to fill the space around the replacement pipe 11 (FIG. 47).

Finally, the tubular guide 13 is withdrawn (FIG. 48), the body 70 is deflated (FIG. 49), for example via a passage extending through the guide rod 5, and the guide rod 5 and deflated body 70 are withdrawn (FIG. 50).

Figure 52:
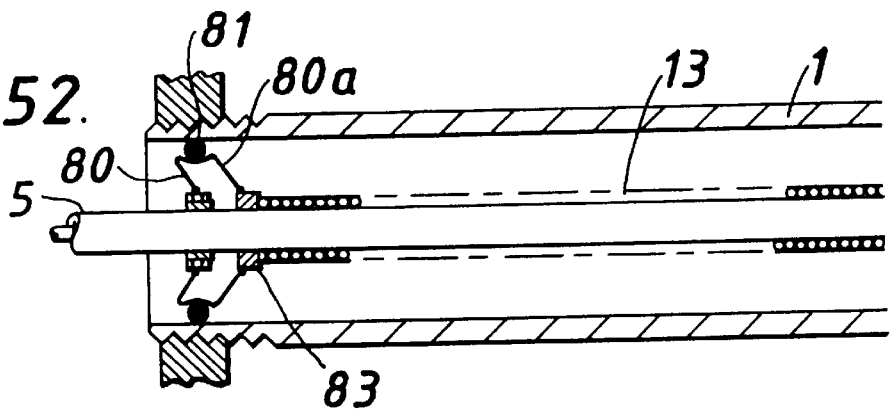
Figure 53:
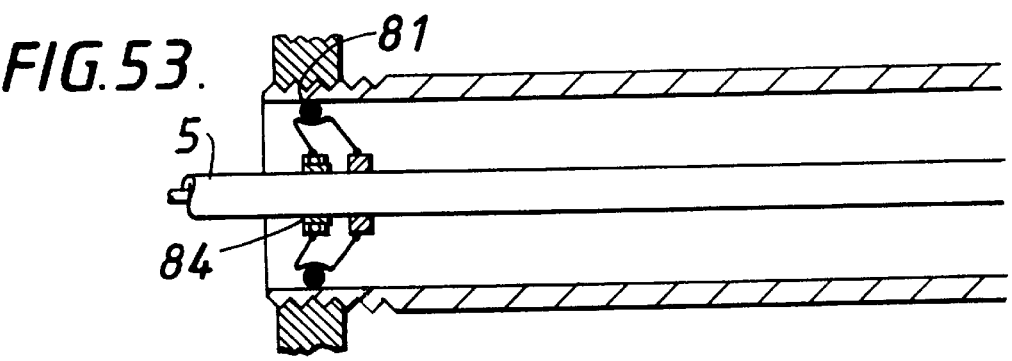

The ninth embodiment of the invention will now be described with reference to FIGS. 51 to 57 of the drawings. As shown in FIG. 51, the guide rod 5 and tubular guide 13 are advanced together along the service pipe 1. The guide rod 5 carries a collar 84 and the tubular guide 13 carries a collar 83. An annular seal 81 is mounted to the collars 84,83 by means of respective annular carrier elements 80,80a. Once the required position within the service pipe 1 has been reached, the tubular guide 13 is slid forwardly on the guide rod 5 (or the guide rod 5 is retracted) to bring the collar 83 closer to the collar 84, so deflecting the annular carrier elements 80,80a radially outwards, and expanding the seal 81 into engagement with the interior surface of the service pipe 1 (FIG. 52). As shown, an over-centre position is reached, so that the tubular guide 13 can then be withdrawn (FIG. 53) whilst the collar 83 remains locked in its forward position.

Figure 54:
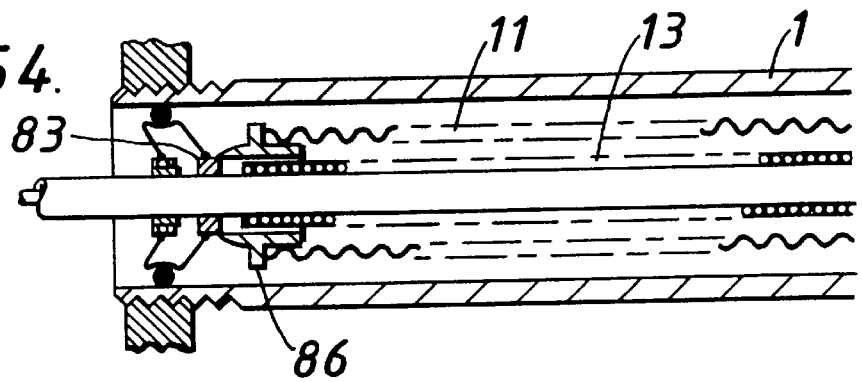
Figure 55:
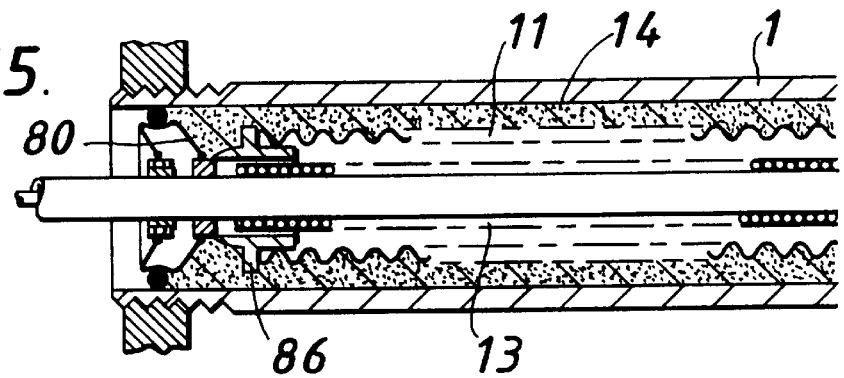
Figure 56:
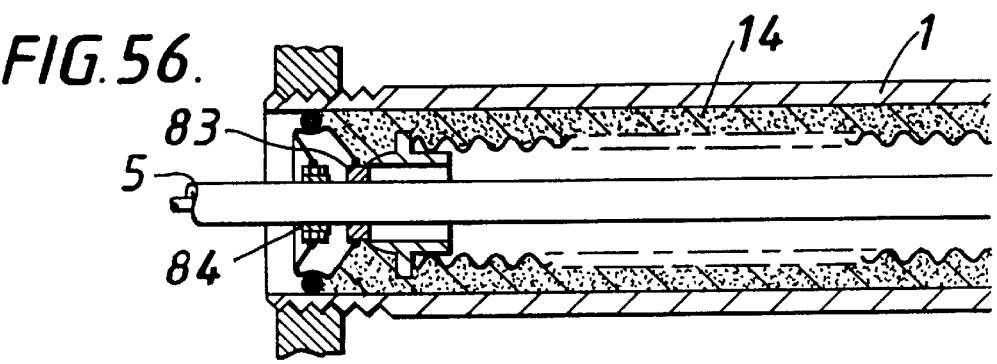
Figure 57:
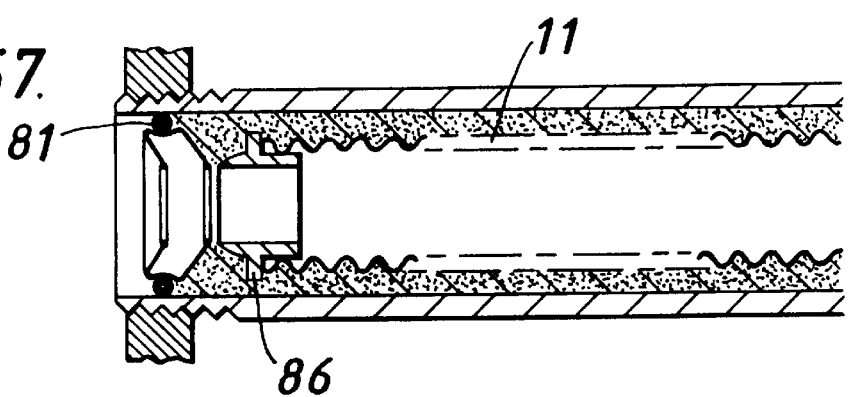

In the next stage (FIG. 54), the tubular guide 13 is used, together with a nose cone 86, to advance the replacement pipe 11 into position, as previously described with reference to FIG. 9, until the forward end of the nose cone 86 locates over the collar 83 (FIG. 54). The sealant 14 is now introduced to fill the space around the replacement pipe 11 and allowed to set (FIG. 55). Finally, the tubular guide 13 is withdrawn (FIG. 56), followed by the guide rod 5 together with the collars 84,83 (FIG. 57).

The tenth embodiment of the invention will now be described with reference to FIGS. 58 to 64 of the drawings. In this case, the guide rod 5 and tubular guide 13 are advanced together along the service pipe 1 (FIG. 58). The guide rod 5 carries a collar 90: the collar 90 and the forward end of the tubular guide 13 carry rigid annular seal plates 91,92 respectively, via mounting flanges 91a,92a of these plates. A seal 93 is mounted between the outer peripheral edges of these two seal plates. When the assembly has reached the required position within the service pipe 1, the tubular guide 13 and guide rod 5 are moved axially relative to each other to bring the seal plates 91,92 together, so deforming the seal 93 radially outwards to seal against the interior surface of the service pipe 1 (FIG. 59). A self-locking arrangement (not shown) is provided so that the seal plates 91,92 remain locked together: this arrangement may comprise catches projecting from one plate and arranged to latch into sockets on the other plate; alternatively, one or both of the plates may be pre-coated with adhesive so that the plates adhere together when brought into contact.

Figure 61:
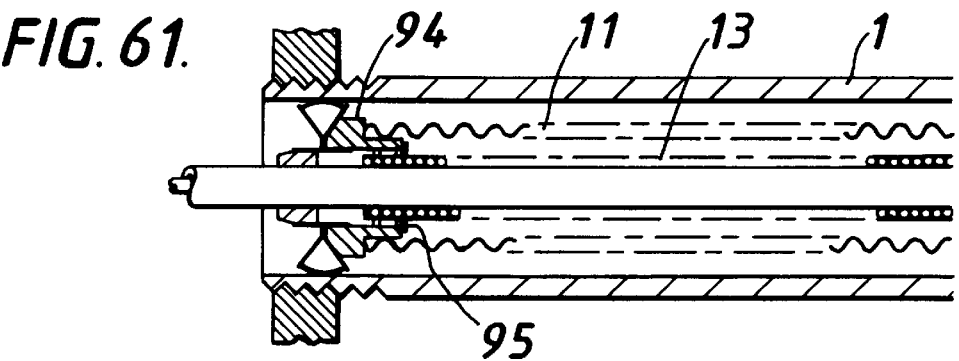
Figure 62:
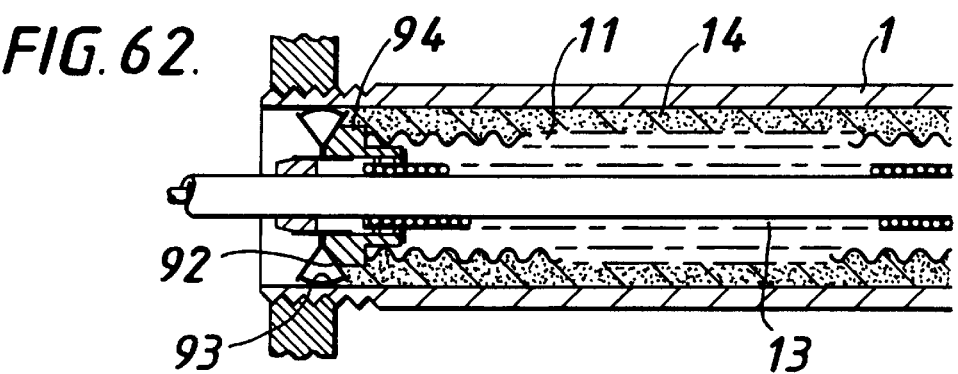
Figure 63:
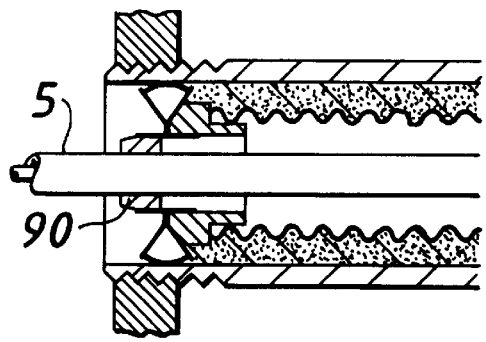
Figure 64:
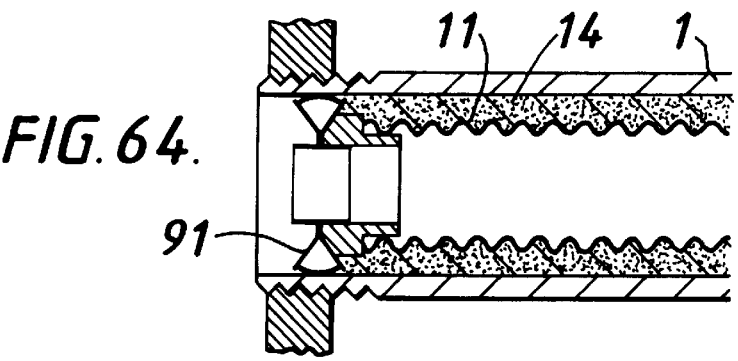

Next, the tubular guide 13 is withdrawn (FIG. 60) and is then used, together with a nose cone 94 and a push-ring 95, to advance the replacement pipe 11, until the forward end of the nose cone 94 locates over the mounting flange 92a of the seal plate 92 (FIG. 61). The sealant 14 is then introduced to fill the space around the replacement pipe 11 (FIG. 62). Finally, the tubular guide 13 is withdrawn (FIG. 63) and then the guide rod 5 is withdrawn together with its collar 90 (FIG. 64).

What is claimed is:

1. A method of installing a replacement pipe within an existing pipe, the method comprising the steps of advancing a sealing means along said existing pipe from one end thereof and then deploying said sealing means, once said sealing means has been advanced to a desired position, to seal against the interior surface of the existing pipe, subsequently advancing said replacement pipe along said existing pipe from one end of said existing pipe, introducing sealant material into the space between said replacement pipe and said existing pipe, and opening said sealing means, an elongate flexible guide element being used to advance said sealing means to said desired position of said sealing means, and said step of opening said sealing means comprising withdrawing said guide element, and breaking a frangible seal between said sealing means and said guide element upon withdrawal of said guide element to open said sealing means, in which said sealing means is deployed by feeding sealant into an annular space between a seal body of said sealing means and the interior surface of said existing pipe.

* * * * *